United States Patent
Tanimura et al.

(10) Patent No.: US 7,928,977 B2
(45) Date of Patent: Apr. 19, 2011

(54) IMAGE COMPOSITING METHOD AND APPARATUS FOR SUPERIMPOSING A COMPUTER GRAPHICS IMAGE ON AN ACTUALLY-SENSED IMAGE

(75) Inventors: Kaname Tanimura, Tokyo (JP); Toshikazu Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 11/217,469

(22) Filed: Sep. 2, 2005

(65) Prior Publication Data

US 2006/0050087 A1      Mar. 9, 2006

(30) Foreign Application Priority Data

Sep. 6, 2004   (JP) ................................ 2004-258405

(51) Int. Cl.
*G06T 15/00*   (2011.01)
(52) U.S. Cl. ......... 345/419; 345/420; 345/632; 345/633
(58) Field of Classification Search .................. None
See application file for complete search history.

(56) References Cited

U.S. PATENT DOCUMENTS

| | | | | |
|---|---|---|---|---|
| 5,900,849 A | * | 5/1999 | Gallery | 345/8 |
| 6,297,804 B1 | * | 10/2001 | Kashitani | 345/157 |
| 6,956,503 B2 | * | 10/2005 | Yokokohji et al. | 340/988 |
| 7,034,779 B2 | * | 4/2006 | Ebersole, Jr. | 345/8 |
| 2005/0024388 A1 | * | 2/2005 | Takemoto | 345/633 |
| 2006/0044327 A1 | | 3/2006 | Okuno et al. | 345/626 |

FOREIGN PATENT DOCUMENTS

| | | |
|---|---|---|
| JP | 11-84307 | 3/1999 |
| JP | 2003-203939 | * 7/2003 |

OTHER PUBLICATIONS

Chen, W., Towles, H., Nyland, L., Welch, G., Fuchs, H., Toward a Compelling Sensation of Telepresence: Demonstrating a portal to a distant (static) office, 2000, Proceedings of the 11th IEEE Visualization 2000 Conference, pp. 1-7.*

Mogilev, D., Kiyokawa, K., Billinghurst, M., Pair, J., AR Pad: An Interface for Face-to-Face AR Collaboration, 2002, Conference on Human Factors in Computing Systems 2002, pp. 654-655.*

Neumann, U., You, S., Hu, J., Jiang, B., Lee, J., Augmented Virtual Environments (AVE): Dynamic Fusion of Imagery and 3D Models, 2003, Proceedings of the IEEE Virtual Reality 2003, pp. 1-7.*

Piekarski, W., Thomas, B., Augmented reality user interfaces and techniques for outdoor modelling, Apr. 2003, Proceedings of the 2003 symposium on Interactive 3D graphics, pp. 225-226 & 255.*

(Continued)

*Primary Examiner* — Said Broome
(74) *Attorney, Agent, or Firm* — Fitzpatrick, Cella, Harper & Scinto

(57) ABSTRACT

A three-dimensional computer graphics model which represents a measurable range of a position and orientation sensor is prepared in advance. A composite image is generated by superimposing an image of a virtual object which represents the measurable range of the position and orientation sensor on an actually-sensed image in real space where the position and orientation sensor is placed. The composite image, when displayed, makes it possible to visually recognize the measurable range of the position and orientation sensor.

4 Claims, 12 Drawing Sheets

OTHER PUBLICATIONS

Raskar, R., Welch, G., Cutts, M., Lake, A., Stesin, L., Fuchs, H., The Office of the Future: A Unified Approach to Image-Based Modeling and Spatially Immersive Displays, Jul. 1998, SIGGRAPH 98, pp. 1-10.*

Hollerer, T., Feiner, S., Hallaway, D., Bell, B., User Interface Management Techniques for Collaborative Mobile Augmented Reality, Oct. 2001, Elsevier Science Ltd., Computers and Graphics 25(5), pp. 1-21.*

W.E. Lorensen, et al., "Marching Cubes: A High Resolution 3D Surface Construction Algorithm" Computer Graphics, vol. 21, No. 4, pp. 163-169 (Jul. 1987).

Satoh, Kiyohide, et al., "A Head Tracking Method Using Bird's-Eye View Camera and Gyroscope," *Proc. 3rd IEEE/ACM Int"l Symposium on Mixed and Augmented Reality* (ISMAR 2004), Nov. 2004, pp. 202-211.

* cited by examiner

F I G. 4
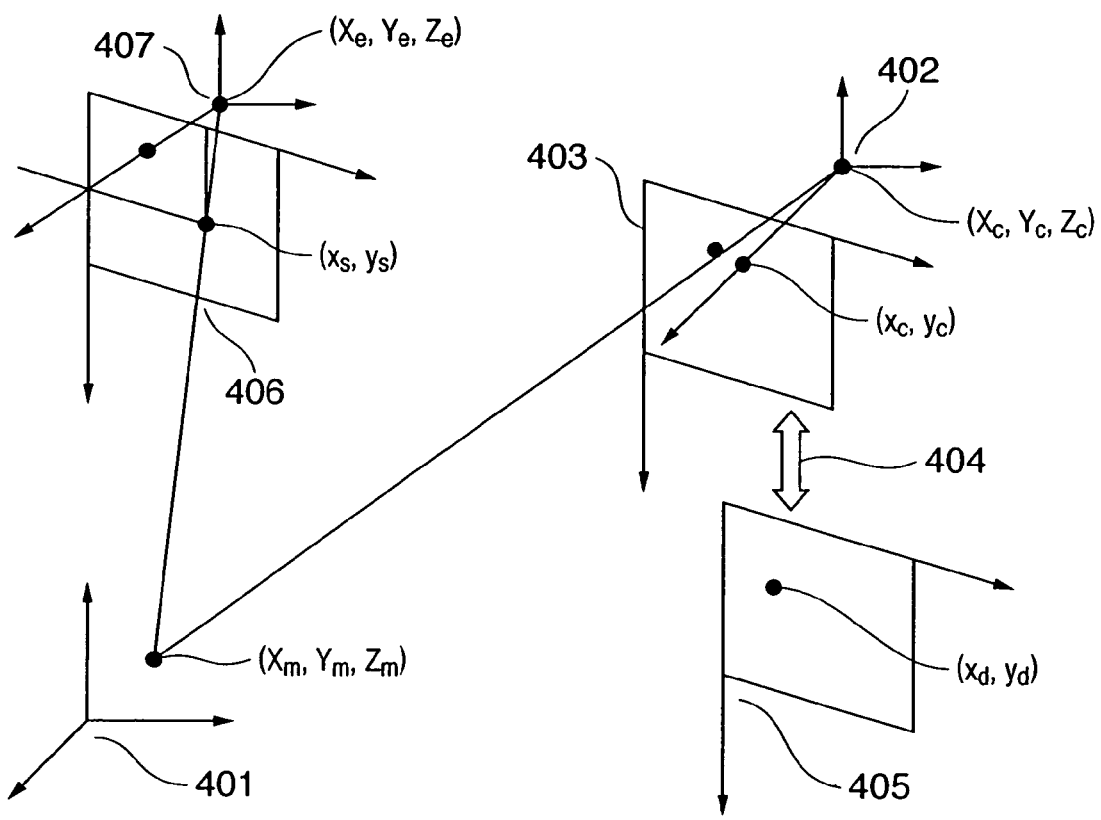

IMAGE COMPOSITING METHOD AND APPARATUS FOR SUPERIMPOSING A COMPUTER GRAPHICS IMAGE ON AN ACTUALLY-SENSED IMAGE

FIELD OF THE INVENTION

The present invention relates to an image compositing technique for aligning and superimposing an image generated by a computer (CG: Computer Graphics) on a real-world image.

BACKGROUND OF THE INVENTION

There is a mixed reality (MR) technique for aligning and superimposing an image of a virtual object generated by computer graphics (hereinafter referred to as CG) on an actually-sensed image to make an observer feel as if the virtual object existed in real space (see, for example, Japanese Patent Laid-Open No. 11-84307).

There are various applications of the MR technique including, for example, a medical-assistance application in which CG of internal organs is aligned and superimposed on actually-sensed images of a patient's body surface, thereby making a doctor feel as if he/she were seeing through the body, an application in which CG of assembly procedures is superimposed on actually-sensed images of a product at a factory, thereby assisting assembly operations, and a guidance application in which place names and other names are superimposed on images of real scenery.

Incidentally, the background on which CG is superimposed does not need to be an actually photographed image and a similar effect can be achieved by displaying only CG on a translucent display member (such as a half mirror) placed in the line of sight of the observer. This method is referred to as an optical see-through method. On the other hand, the method which uses an actually-sensed image as the background is known as a video see-through method.

To make the observer experience a sensation of mixed reality without feeling a sense of incongruity, it is important to accurately align the real space serving as the background with the CG to be superimposed on it. Therefore, to superimpose CG with a reduced sense of incongruity, it is normal practice to measure the viewpoint position and orientation of the observer and then generate CG using the measured viewpoint position and orientation and a three-dimensional model of a virtual object.

The viewpoint position and orientation of the observer is provided as information which has six degrees of freedom, and thus sensors (position and orientation sensors) available to measure them are limited. Generally, magnetic sensors, optical sensors, or image sensors are used.

However, position and orientation measuring sensors including magnetic sensors and image sensors have a predetermined measurable range and can measure position and orientation only within this measurable range. Consequently, arrangement of sensors limits the viewer's allowed range of motion.

Thus, when installing sensors at a site, it is a big issue how to arrange the sensors. However, since information used by the sensors such as magnetism or light cannot be captured visually, the measurable ranges of the sensors cannot be seen visually and the sensors must be arranged by relying on experience and hunches after all. However, sensor arrangement based on hunches may not allow a planned measurable range to be secured. This is inefficient because of the need to install and adjust the sensors repeatedly.

SUMMARY OF THE INVENTION

The present invention has been made in view of the above circumstances and has an object to make it possible to arrange position and orientation sensors efficiently in an appropriate manner by visualizing measurable ranges of the sensors.

According to an aspect of the present invention, there is provided a image compositing method for superimposing a computer graphics image on an actually-sensed image, comprising: a setting step of setting a three-dimensional computer graphics model which represents a measurable range of a position and orientation sensor; a sensor position information acquisition step of acquiring position information about the position and orientation sensor; a CG image generating step of generating a computer graphics image which represents the measurable range using the position information about the position and orientation sensor and the three-dimensional computer graphics model; and an image compositing step of compositing the actually-sensed image with the computer graphics image.

According to another aspect of the present invention, there is provided an image compositing method for superimposing a computer graphics image on an actually-sensed image using position and orientation information measured by a position and orientation sensor with a predetermined measurable range, comprising: a setting step of setting a three-dimensional computer graphics model which represents the predetermined measurable range; a camera position and orientation information acquisition step of acquiring position and orientation information about a camera which shoots the actually-sensed image, using the position and orientation sensor; a CG image generating step of generating a computer graphics image which represents the predetermined measurable range using the camera position and orientation information and the three-dimensional computer graphics model; and an image compositing step of compositing the actually-sensed image with the computer graphics image.

According to another aspect of the present invention, there is provided an image compositing method for compositing an actually-sensed image shot by a camera installed on head-mounted display worn by an observer with an image of a virtual object generated from a previously prepared three-dimensional computer graphics model of the virtual object and position and orientation information about the camera and displaying the composite image on the head-mounted display, comprising: a setting step of setting a three-dimensional computer graphics model which represents a measurable range of a position and orientation sensor placed in a space in which an observer exists; and an image generating step of generating an image of a virtual object, representing the measurable range.

According to another aspect of the present invention, there is provided an image compositing apparatus which superimposes a computer graphics image on an actually-sensed image, comprising: setting unit adapted to set a three-dimensional computer graphics model which represents a measurable range of a position and orientation sensor; sensor position information acquisition unit adapted to acquire position information about the position and orientation sensor; CG image generating unit adapted to generate a computer graphics image which represents the measurable range using the position information about the position and orientation sensor and the three-dimensional computer graphics model; and image compositing unit adapted to composite the actually-sensed image with the computer graphics image.

According to another aspect of the present invention, there is provided an image compositing apparatus which superimposes a computer graphics image on an actually-sensed image using position and orientation information measured by a position and orientation sensor with a predetermined measurable range, comprising: setting unit adapted to set a three-dimensional computer graphics model which represents the predetermined measurable range; camera position and orientation information acquisition adapted to acquire position and orientation information about a camera which shoots the actually-sensed image, using the position and orientation sensor; CG image generating unit adapted to generate a computer graphics image which represents the predetermined measurable range using the camera position and orientation information and the three-dimensional computer graphics model; and image compositing unit adapted to composite the actually-sensed image with the computer graphics image.

According to another aspect of the present invention, there is provided an image compositing apparatus which composites an actually-sensed image shot by a camera installed on head-mounted display worn by an observer with an image of a virtual object generated from a previously prepared three-dimensional computer graphics model of the virtual object and position and orientation information about the camera and displaying the composite image on the head-mounted display, comprising: setting unit adapted to set a three-dimensional computer graphics model which represents a measurable range of a position and orientation sensor placed in a space in which an observer exists; and image generating unit adapted to generate an image of a virtual object, representing the measurable range.

With the above configuration, the present invention makes it possible to visualize invisible measurable ranges of sensors, and thereby arrange the sensors efficiently in an appropriate manner.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing coordinate systems employed by the image compositing apparatus according to this embodiment;

DETAILED DESCRIPTION OF THE PREFERRED EMBODIMENTS

Preferred embodiments of the present invention will now be described in detail in accordance with the accompanying drawings.

First Embodiment

An example of an image compositing apparatus according to a first embodiment acquires positional information about sensors based on markers attached to the sensors, superimposes measurable ranges of the sensors on the given positions using three-dimensional CG model data, and thereby visualizes the measurable ranges of the sensors. Incidentally, the three-dimensional CG model data used to visualize the measurable ranges may be based on either sensor specifications or experience. Besides, there are no particular limits on a display method of the model data, and the model data may be either outputted as they are or outputted with their degree of transparency specified.

(Configuration of the Image Compositing Apparatus)

Figure 1:
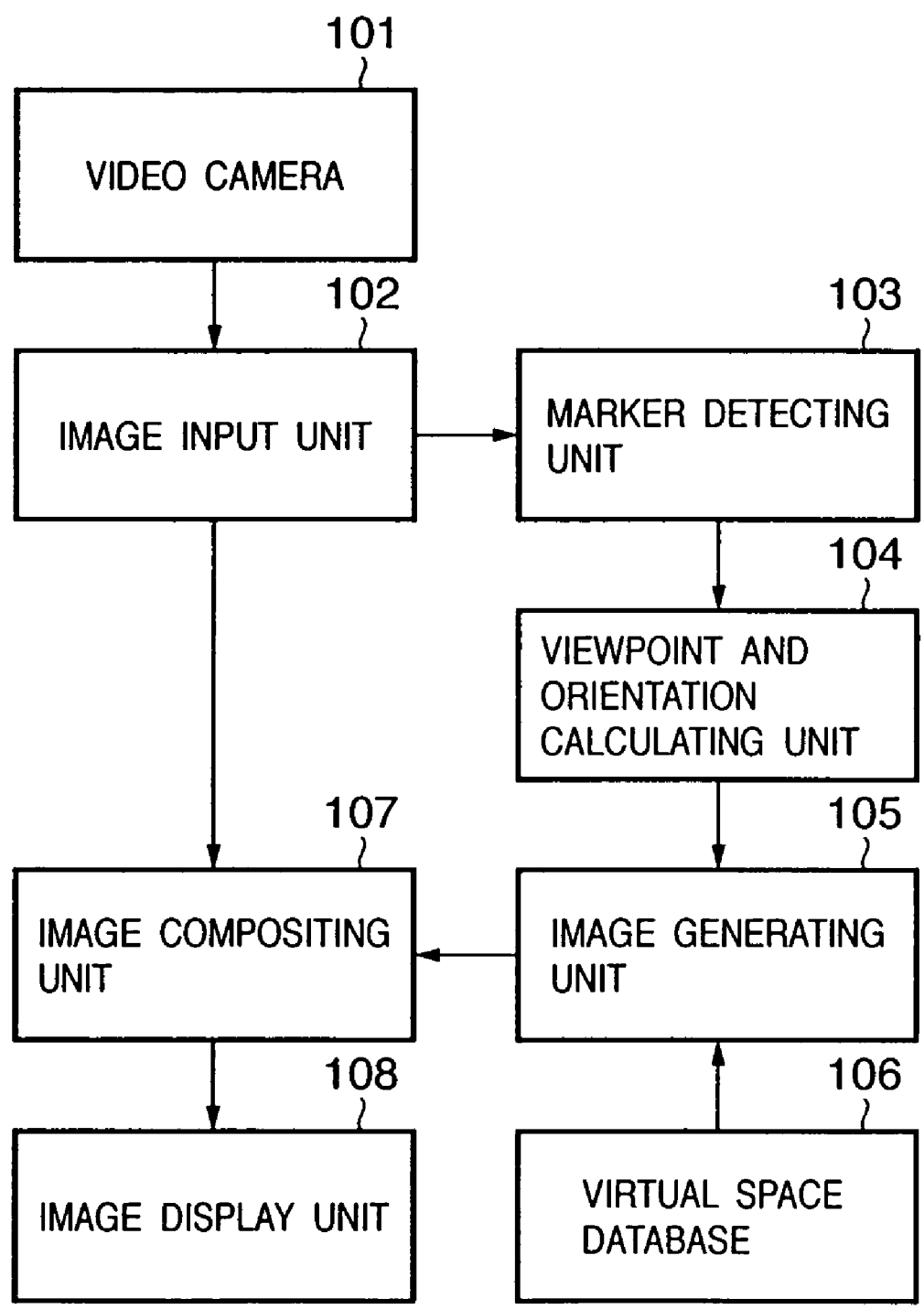
FIG. 1 is a block diagram showing a configuration example of an image compositing apparatus according to a first embodiment of the present invention.
Figure 2:
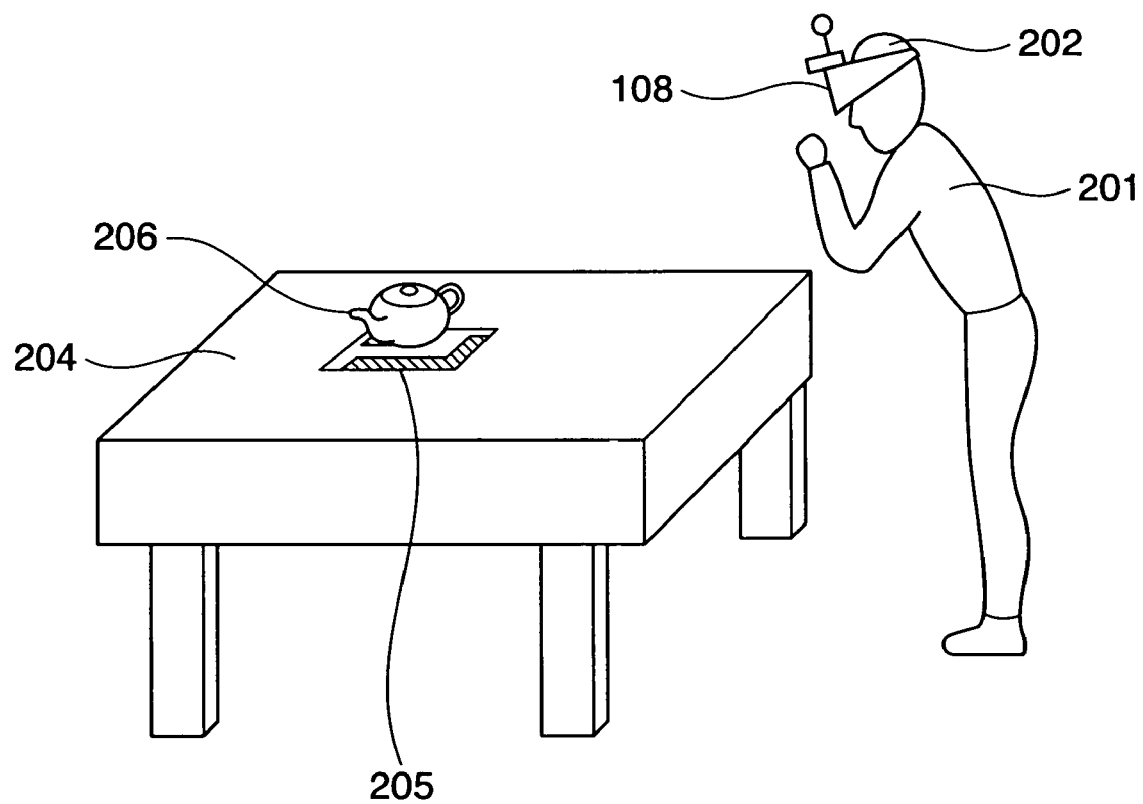
FIG. 2 is a diagram schematically showing a concrete equipment configuration and a sensation of mixed reality experienced by an observer when the image compositing apparatus in FIG. 1 is used in a mixed reality application.

FIG. 1 is a block diagram showing a configuration example of the image compositing apparatus according to this embodiment. FIG. 2 is a diagram schematically showing a concrete equipment configuration and a sensation of mixed reality experienced by an observer when the image compositing apparatus in FIG. 1 is used in a mixed reality application.

In FIG. 1, small video cameras 101 shoot real space. As shown in FIG. 2, the video cameras 101 are fixed in those parts of a head-mounted display (hereinafter referred to as the HMD) 108 which are close to the right and left eyes of an observer 201, respectively, being oriented in such a direction that coincides with the observer's line of sight. Instead of using video cameras 101 for right and left eyes, a monoscopic video camera may be used or video cameras may be mounted on a hand-held display (hereinafter referred to as an HHD).

Incidentally, for ease of explanation and understanding, processes on a pair of images shoot by the video cameras for the right and left eyes may be described as processes on a single image. However, when a pair of video cameras (stereoscopic camera) are used, the same processes are performed on the image shoot by each video camera and a pair of composite images are generated and presented separately on a right-eye display unit and left-eye display unit.

For example, an image input unit 102 which is a video capture board receives video (an image) shot by the video camera 101. In FIG. 2, it is assumed that the observer is looking at a desk which is a real object. A signal of the image shot by the video camera 101 is processed by the image input unit 102 and supplied as digital image data to an image compositing unit 107 and marker detecting unit 103.

The marker detecting unit 103 detects a two-dimensional marker 205 (shown in FIG. 2) in the image supplied from the image input unit 102. The two-dimensional marker is an index whose absolute position in real space is known and which has features (color, shape, pattern, etc.) extractable from the image. Thus, the marker detecting unit 103 detects the two-dimensional marker 205 by searching the image for an area containing the features of the two-dimensional marker 205.

A viewpoint and orientation calculating unit 104 calculates the three-dimensional position and orientation of the HMD 108 mounted on the head 202 of the observer 201 using marker information (the position, orientation, and area of the marker 205 in the image) detected by the marker detecting unit 103, the positions of the features of the marker 205 in a marker coordinate system, camera parameters of the video camera 101. Details of the viewpoint and orientation calculating unit 104 will be described later.

An image generating unit 105 draws three-dimensional CG model data registered in a virtual space database 106 which is, for example, a hard disk drive based on position and orientation data of the HMD 108 calculated by the viewpoint and orientation calculating unit 104. Consequently, a CG image to be observed by the observer 201 is generated. The generated CG image is supplied to the image compositing unit 107. The CG image generated by the image generating unit 105 is based on information contained in the virtual space database 106 including geometric information, attribute information such as color and texture, and lighting information, about a CG model. Generation of three-dimensional images is a known technique, and thus description thereof will be omitted.

The image compositing unit 107 composites an actually-sensed image from the image input unit 102 with a CG image (image of a virtual object 206) from the image generating unit 105 and outputs the resulting image to the HMD 108. When the observer 201 looks at the composite image displayed on the HMD 108, it appears as if the virtual object 206 were located on the desk 204.

Except the video camera 101, functional blocks of the image compositing apparatus can be implemented by a general-purpose computer equipped with a video capture board. Thus, at least part of the processes of the image compositing apparatus described below can be implemented in a software manner as a CPU executes a control program.
(Visualization of Sensors' Measurable Ranges)

This embodiment is characterized in that the measurable ranges of sensors are visualized by the image compositing apparatus described above.

Figure 3:
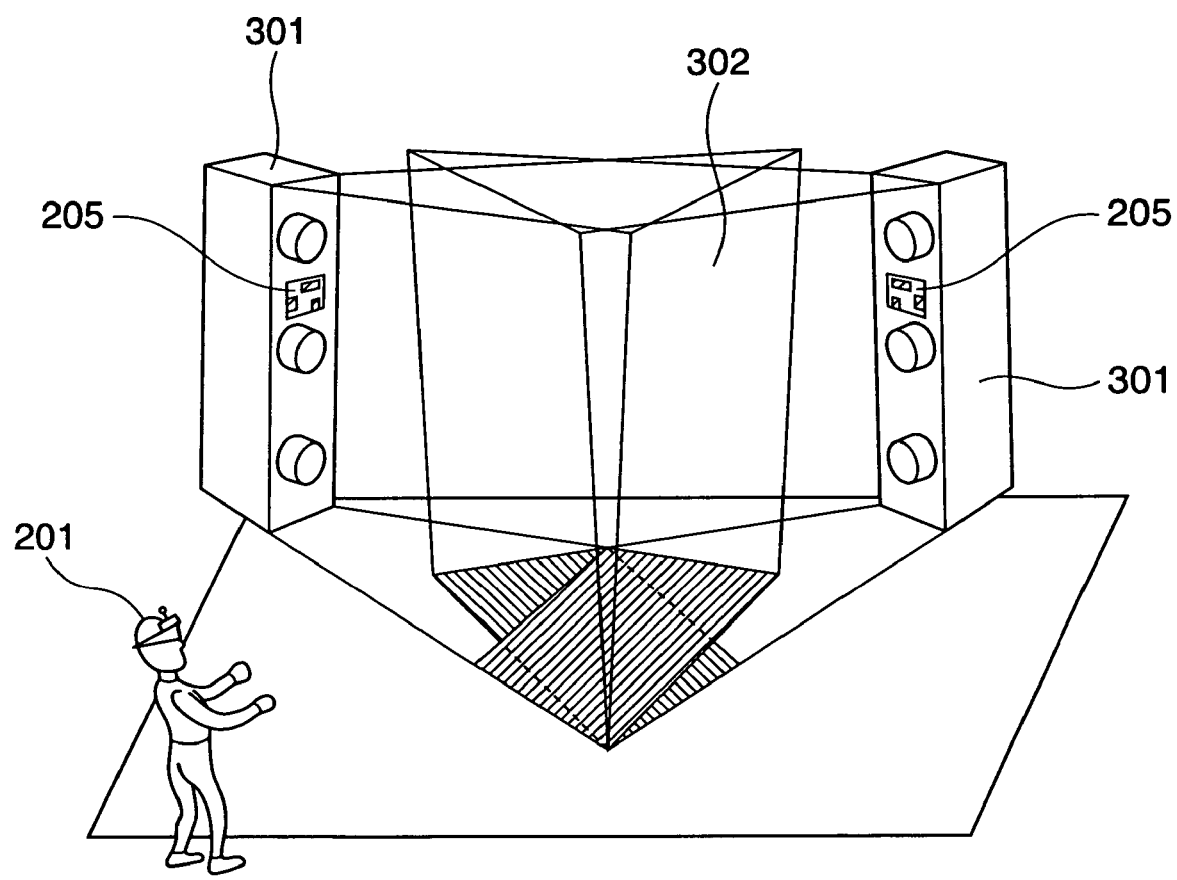
FIG. 3 is a diagram schematically showing visualized measurable ranges of position and orientation sensors according to this embodiment.

FIG. 3 is a diagram schematically showing visualized measurable ranges of position and orientation sensors according to this embodiment.

The observer 201 shoots the two-dimensional markers 205 attached to a pair of sensors 301 using, for example, the video camera 101 mounted on the HMD 108. Previously prepared three-dimensional model data of the measurable ranges of the sensors 301 are read out of the virtual space database 106 and CG images 302 which represent the measurable ranges of the sensors 301 are generated based on the observer's viewpoint and orientation calculated by the viewpoint and orientation calculating unit 104. The CG images are composited with an actually-sensed images shot by the video camera 101 and displayed on the HMD 108 to present the measurable ranges of the sensors 301 to the observer.

Incidentally, as described above, the three-dimensional CG model data which represent measurable ranges of the sensors may be prepared based on either sensor specifications or experience. Also, the CG model may be displayed by any display method: it may be displayed as wire frames, as a solid which has surfaces, as an opaque object, or as an object which has a degree of transparency. When there are multiple sensors, the measurable ranges of the individual sensors can be distinguished if they are varied in a visually identifiable attribute such as color. Also, an overlap of measurable ranges can be seen easily if the respective measurable ranges of two sensors are displayed in red and blue while the overlap is displayed in purple.

According to this embodiment, the two-dimensional marker 205 consists of a black square drawn on a white card. A pattern in the black square is varied from marker to marker to facilitate identification of the markers. Details of the markers will also be described later.
(Methods for Creating a Three-dimensional Model of Sensors' Measurable Ranges).

There are various possible methods for creating a three-dimensional model of sensors' measurable ranges for use in this embodiment.

Methods for creating a three-dimensional model based on sensor specifications will be described first.

Figure 9:
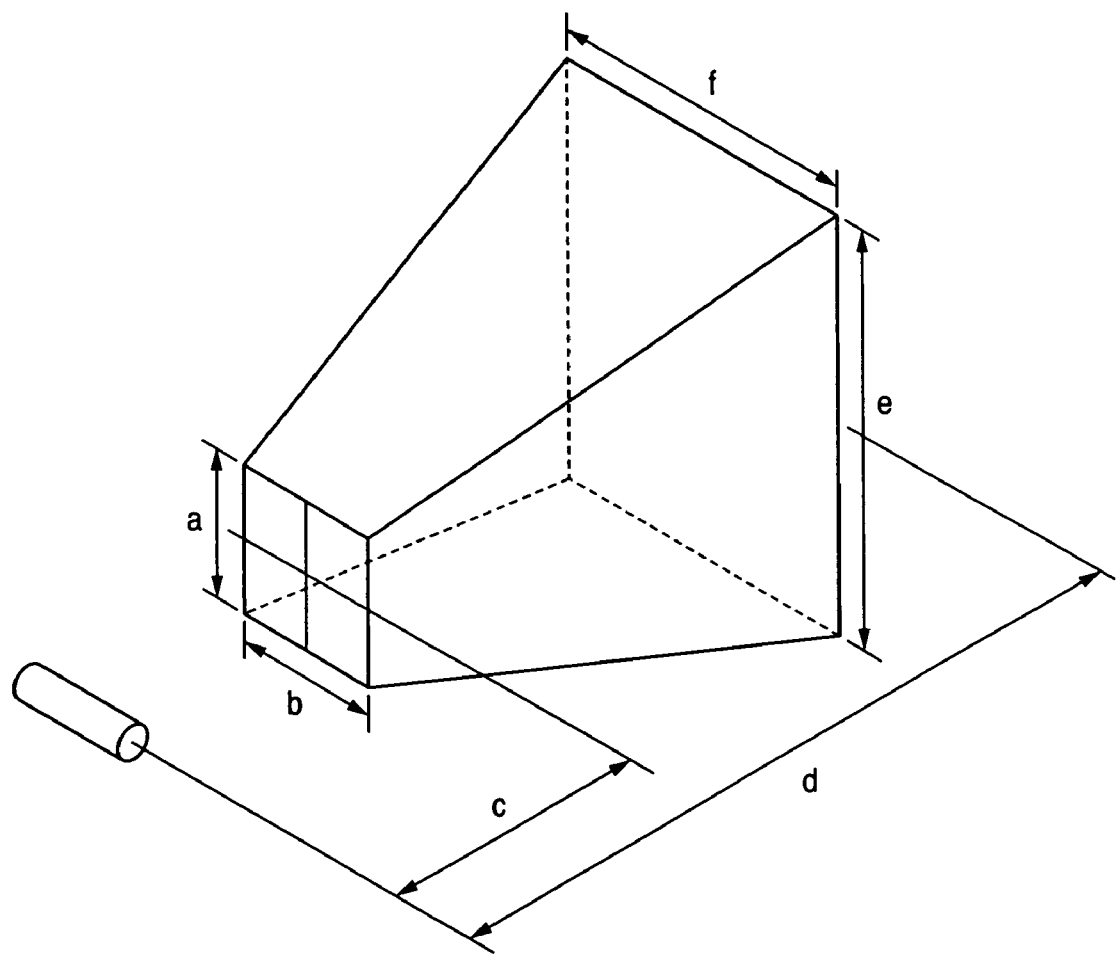
FIG. 9 is a diagram showing a specification example of a sensor's measurable range.

If the position and orientation sensor is an optical type, a three-dimensional model of the sensor's measurable range can be created by inputting dimensions of the measurable range on computer graphics modeling software based on the sensor's specifications such as those shown in FIG. 9.

If the sensor is a magnetic type, a three-dimensional model of the sensor's measurable range can be created by creating a hemisphere having as its radius the distance of the measurable range described in the sensor's specifications on computer graphics modeling software.

Methods for creating a three-dimensional model of a sensor's measurable range based on experience will be described next.

If the sensor sends a message indicating that the object to be sensed is "outside the measurable range," multiple items of coordinate (X, Y, Z) data just before that are acquired and stored. By generating a polygon whose vertices are located at the stored coordinate points, it is possible to build a model of the measurable range. Known methods for generating a polygon from stored vertices include the Marching Cubes method (W. E. Lorensen and H. E. Cline, Marching Cubes: A High Resolution 3D Surface Construction Algorithm, ACM Computer Graphics, 21 (3), 1987).

If no "outside the measurable range" message is received, three-dimensional data are created based on prior experience of the operator. In the case of a magnetic sensor, for example, the radius of a hemisphere is determined based on measurement results and a three-dimensional model of the hemisphere is created.
(Viewpoint and Orientation Calculating Unit 104)

Now, operation of the viewpoint and orientation calculating unit 104 which serves an important function in the image compositing apparatus according to this embodiment will be described in detail. The basic operation of the viewpoint and orientation calculating unit 104 is coordinate transformation.

FIG. 4 is a diagram showing coordinate systems employed by the image compositing apparatus according to this embodiment.

According to this embodiment, the virtual object 206 is expressed in a marker coordinate system 401.

Based on relationship between marker positions in photographic images and marker positions in the marker coordinate system, a transformation matrix $T_{cm}$ which defines a transformation from the marker coordinate system to a camera coordinate system is determined dynamically. A three-dimensional model of the sensor's measurable range defined in the marker coordinate system is transformed based on a transformation matrix $T_{sc}$ prepared in advance defining a transformation from the camera coordinate system to an HMD screen coordinate system as well as on the transformation matrix $T_{cm}$, and consequently the virtual object 206 is displayed on the HMD screen.

A calculation method of the transformation matrices will be described concretely below.

According to the embodiment in FIG. 3, a marker is attached to each of the two sensors and the respective three-dimensional models of the sensors are managed separately. Thus, in this embodiment, the transformation matrices shown below are calculated for each marker.

In the camera coordinate system 402, the origin is located at the focal point, the direction perpendicular to an image plane is defined as the Z axis, and the directions parallel to the x and y axes of the image are defined as the X and Y axes.

An arbitrary point $(X_m, Y_m, Z_m)$ expressed in the marker coordinate system 401 can be transformed into a point in the camera coordinate system 402 by a combination of rotational translations and parallel translations. In the camera coordinate system 402, it is denoted as $(X_c, Y_c, Z_c)$.

The image plane projected by means of a perspective transformation model is referred to as an ideal screen coordinate system 403. It is assumed that the point $(X_c, Y_c, Z_c)$ in the camera coordinate system 402 is mapped to $(x_c, y_c)$ in the ideal screen coordinate system 403.

In a mixed reality system, position measurements must be taken in a wide range, and thus wide-angle lenses are used for the video cameras 101. Consequently, barrel distortion appears in photographed images.

To deal with this situation, a coordinate system transformed from the ideal screen coordinate system 403 by means of an image distortion transformation function 404 is defined as an observed screen coordinate system 405, image data actually captured from the video cameras 101 are expressed in the observed screen coordinate system 405, and any coordinate point in it is represented by $(x_d, y_d)$.

The HMD 108 and observer's eyes can be represented by ideal perspective transformation models. An image display surface of the HMD 108 is referred to as an HMD screen coordinate system 406 and any coordinate point in it is represented by $(x_s, y_s)$. A coordinate system whose X and Y axes are oriented in the same direction as those of the HMD screen coordinate system 406, whose Z axis is oriented in the direction perpendicular to the HMD screen coordinate system 406, and whose origin is located at the focal point of the eye is referred to as a viewpoint coordinate system 407 and any coordinate point in it is represented by $(X_e, Y_e, Z_e)$.

The viewpoint coordinate system 407 is easier to understand if the Z axis coincide with the line of sight, but in order to build a perspective transformation model in relation to the HMD screen coordinate system 406, it is important to establish a coordinate system defined by a relative relationship with the screen. Although both viewpoint coordinate system 407 and HMD screen coordinate system 406 should be established for each of the right and left eyes, it is assumed here for simplicity of explanation that the coordinate systems are common to both right and left eyes.

Figure 5:
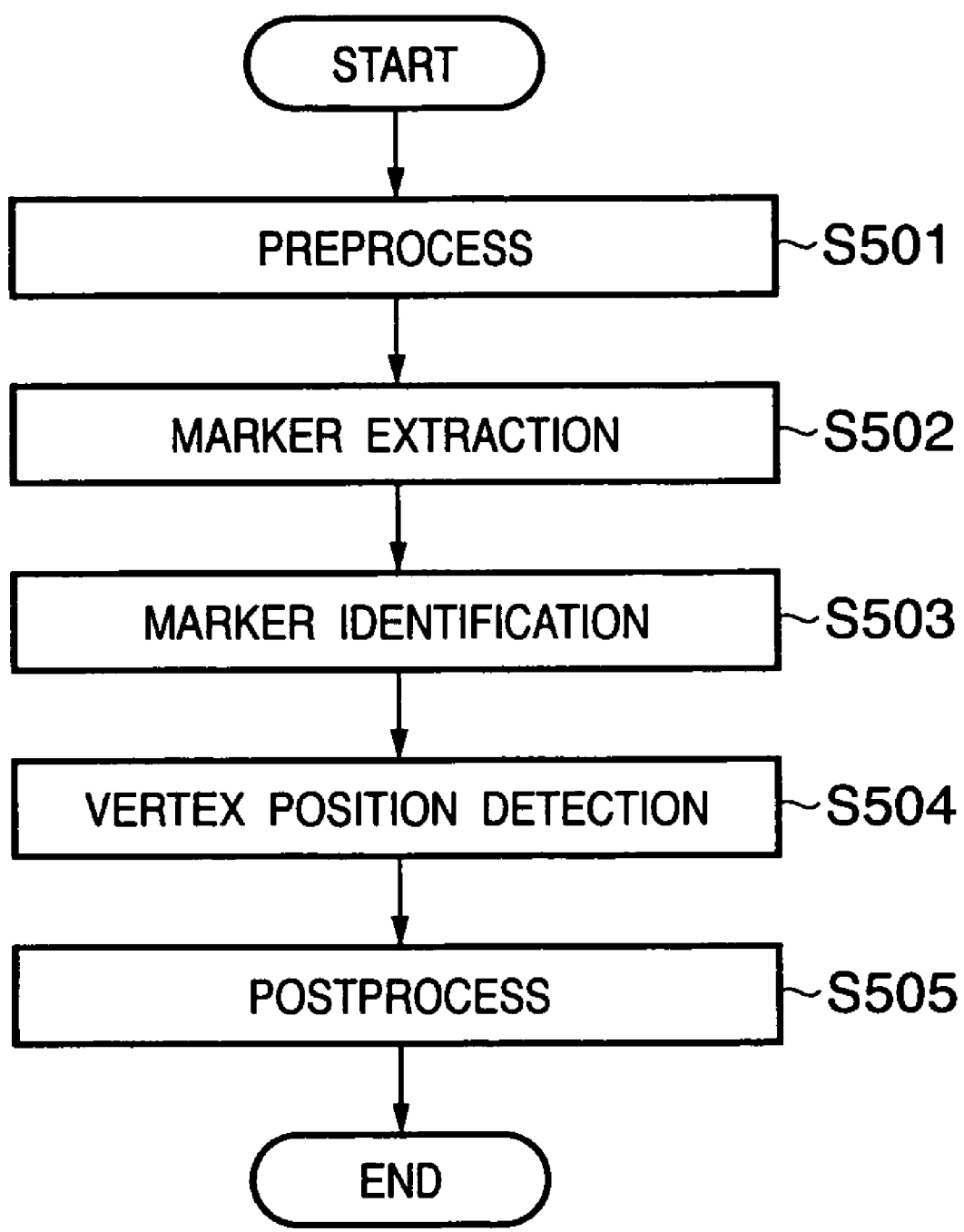
FIG. 5 is a flowchart outlining a viewpoint position and orientation calculating process performed by the image compositing apparatus according to this embodiment.

Next, processes performed by the viewpoint and orientation calculating unit 104 will be outlined with reference to a flowchart shown in FIG. 5.

A preprocess in S501 involves binarizing an inputted actually-sensed image by the use of a fixed threshold and calculating an area and circumscribed rectangle of each connected region. This embodiment employs an algorithm which performs these processes in a single pass, thereby speeding up processing.

Marker extraction in S502 involves removing specific regions from connected regions detected in S501: very large and very small regions are removed based on their area values, and connected regions which borders on image boundaries are removed based on information about the rectangles circumscribing connected regions.

Contours of the remaining connected regions are traced and all pixel positions on contours are stored.

Contour data are approximated by a polygonal line, and connected regions approximated by four lines with a sufficient accuracy are designated as a marker candidate. The coordinate values of four polygon vertices of the marker candidate are stored.

Figure 6:
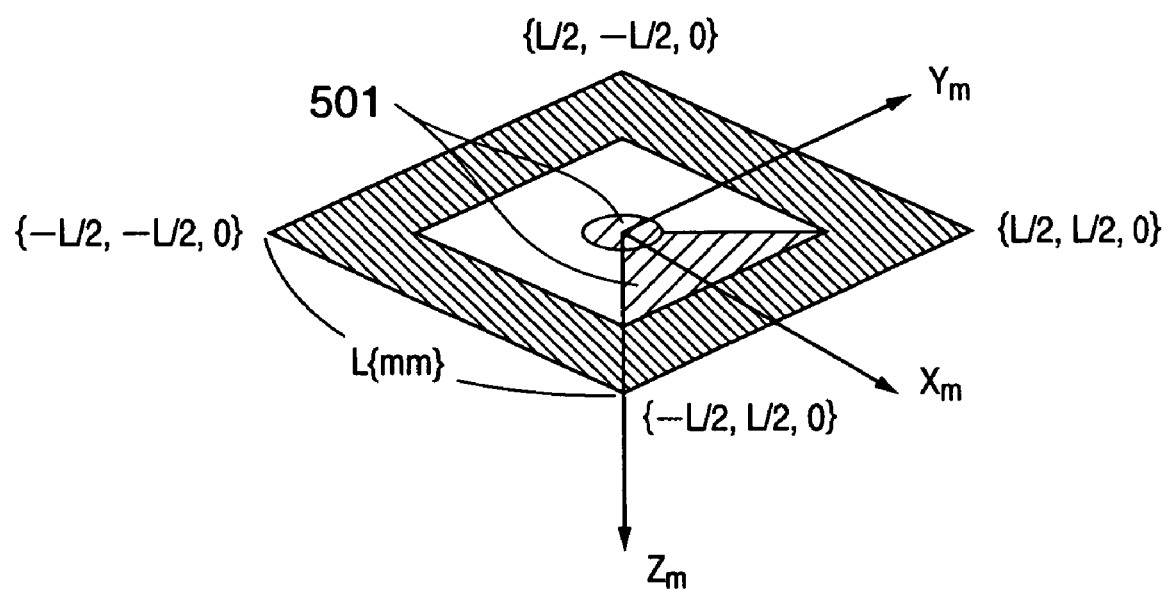
FIG. 6 is a diagram showing an example of a two-dimensional marker which can be employed by this embodiment.

FIG. 6 shows an example of a dimensional marker applicable to this embodiment.

The two-dimensional marker is a square marker consisting of an identification pattern 501 in a black frame. In this embodiment, markers are identified by template matching. Thus, any symbol can be used as the identification pattern in the center as long as it allows orientation (up, down, left, right) of the marker to be identified.

Marker identification in S503 involves detecting and identifying a marker by template matching between an actually-sensed image and a pre-registered pattern.

To do the template matching, the image should be normalized.

First, the marker is projected from the marker coordinate system 401 to the ideal screen coordinate system 403 by means of a perspective transformation model.

Equation (1) is a transformation formula used to transform a point $(X_m, Y_m, 0)$ in an $X_m$-$Y_m$ plane in the marker coordinate system 401 into a point $(x_c, y_c)$ in the ideal screen coordinate system 403 by means of a perspective transformation model matrix C.

$$\begin{bmatrix} hx_c \\ hy_c \\ h \end{bmatrix} = \begin{bmatrix} C_{11} & C_{12} & C_{13} \\ C_{21} & C_{22} & C_{23} \\ C_{31} & C_{32} & 1 \end{bmatrix} \begin{bmatrix} X_m \\ Y_m \\ 1 \end{bmatrix} \quad (1)$$

Since physical size of the marker is known (length L (mm) of one side in FIG. 6), the value of the perspective transformation model matrix C can be determined by solving simultaneous equations using information about the physical size and coordinate values of the four vertices of the marker candidate region. Thus, the pattern in the marker can be normalized using this equation.

Specifically, the patterned region in the marker is divided into regions measuring 64×64, a pixel value corresponding to each region is extracted from the input image, and a pattern image of 64×64 pixels is obtained. This image is reduced into a 16×16 pixel image for use in template matching.

A total of four templates rotated by 0, 90, 180, and 270 degrees, respectively, to allow for rotation of the marker are prepared for use in template matching.

Similarity between each of the four template images and the input image is calculated using Equation (2) below.

$$s^{(l)} = \frac{\sum_{i=1}^{N}(x_i - \tilde{x}) \cdot (x_i^{(l)} - \tilde{x}^{(l)})}{\sqrt{\sum_{i=1}^{N}(x_i - \tilde{x})^2} \sqrt{\sum_{i=1}^{N}(x_i^{(l)} - \tilde{x}^{(l)})^2}} \quad (2)$$

In Equation (2), $x_i$ denotes the i-th element of the reduced image (image vector) of 16×16 pixels, $\tilde{x}$ denotes an average value among elements, N denotes the number of dimensions (255 in this case), $x^{(l)}$ denotes the l-th template image (l=1, 2, 3, 4), $x_i^{(l)}$ denotes the i-th pixel in the l-th template image. Equation (2) determines the cosine of two image vectors whose brightness has been normalized.

The type and orientation of the template which has the largest similarity to the reduced image are regarded to be the type and orientation of the marker.

Vertex position detection in S504 involves fitting lines to contour data corresponding to the sides of the marker by least squares method and designating the intersection points of the lines as the coordinate values of the vertices.

$$\frac{z_d}{z_c} = \{1 - pz_c^2\} \quad (3)$$

$$z_c^2 = (x_c - x_{c0})^2 + (y_c - y_{c0})^2, \quad z_d^2 = (x_d - x_{c0})^2 + (y_d - y_{c0})^2$$

$$x_d = \frac{z_d}{z_c}(x_c - x_{c0}) + x_{c0}, \quad y_d = \frac{z_d}{z_c}(y_c - y_{c0}) + y_{c0}$$

In the line fitting, a transformation is performed based on a distortion function given by Equation (3), to determine the coordinate values of the vertices in the ideal screen coordinate system 403.

In the above equation, $(x_c, y_c)$ represent coordinate values in the ideal screen coordinate system 403 and $(x_d, y_d)$ represent coordinate values in the observed screen coordinate system 405.

Also, p represents a distortion factor and $(x_{c0}, y_{c0})$ represent the coordinate values of the center of the distortion. These three parameters are calculated via camera calibration in advance.

An observed square marker image contains barrel distortion due to the influence of a wide-angle lens, but the barrel distortion is corrected by the transformation formula (3) for transformation from the observed screen coordinate system 405 to the ideal screen coordinate system 403, and consequently the sides can be treated as straight lines.

Finally, a postprocess in S505 involves reducing false detections of markers. Specifically, past detection positions and sizes of markers are stored during processing, and a detected marker is regarded to be identical to a stored marker if they are similar in position and size. If their similarity is lower than a predetermined value, it is determined that they are different markers or that this is a false detection. This makes it possible to reduce errors in pattern identification of markers.

Next, a three-dimensional marker position estimation process will be described.

First, the transformation matrix $T_{cm}$ for transformation from the marker coordinate system 401 to the camera coordinate system 402 is estimated.

The transformation matrix consists of a rotational translation component R and parallel translation component T. Transformations between the ideal screen coordinate system 403 and camera coordinate system 402 can be carried out using a perspective transformation model. A specific transformation matrix P for use here can be calculated by calibration in advance. The calculation of a perspective transformation model is a commonly used technique, and thus description of a concrete calculation method will be omitted.

Equations (4) and (5) below show relationships among the above coordinate systems.

$$\begin{bmatrix} X'_c \\ Y'_c \\ Z'_c \\ 1 \end{bmatrix} = T_{cm} \begin{bmatrix} X_m \\ Y_m \\ Z_m \\ 1 \end{bmatrix} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \begin{bmatrix} X_m \\ Y_m \\ Z_m \\ 1 \end{bmatrix} \quad (4)$$

$$\begin{bmatrix} x_c \\ y_c \\ z_c \\ 1 \end{bmatrix} = P \begin{bmatrix} X_c \\ Y_c \\ Z_c \\ 1 \end{bmatrix} = \begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix} \begin{bmatrix} X'_c \\ Y'_c \\ Z'_c \\ 1 \end{bmatrix} \quad (5)$$

Whereas Equation (1) provides a relation between coordinate values (two-dimensional coordinate values) in an $X_m$-$Y_m$ plane in the marker coordinate system 401 and the ideal screen coordinate system 403, Equations (4) and (5) provide a relation between three-dimensional coordinate values in the marker coordinate system 401 and camera coordinate system 402.

The coordinate values of the four vertices of the marker in the marker coordinate system 401 have been set as shown in FIG. 6. Corresponding coordinate values in the ideal screen coordinate system 403 have been obtained in the above processes.

Figure 7:
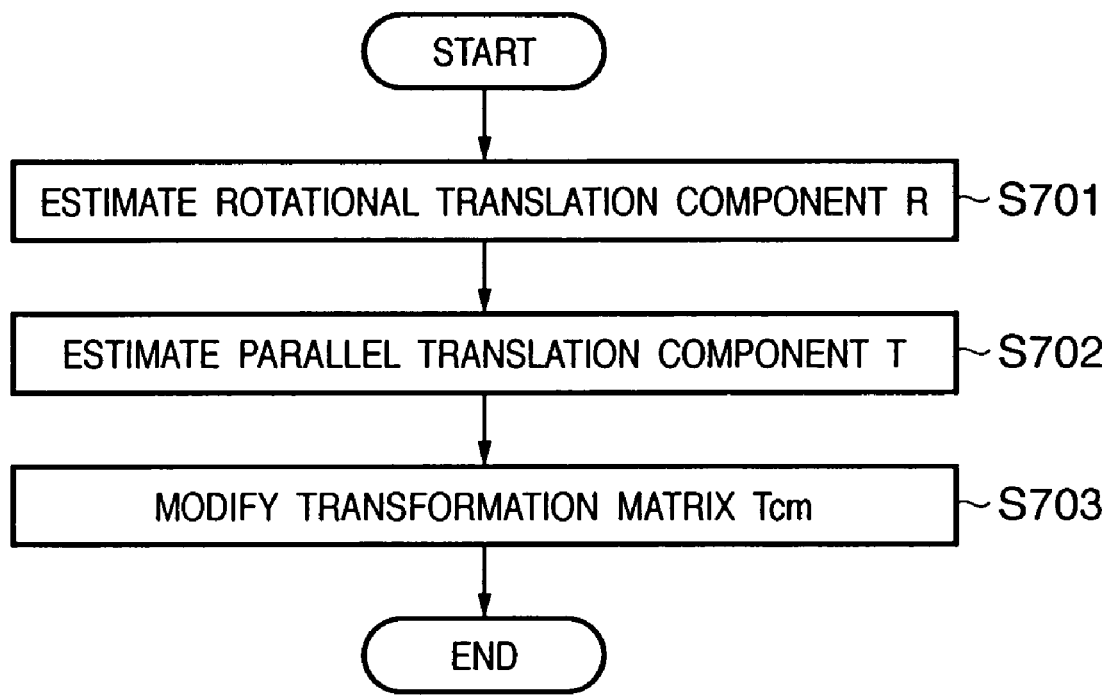
FIG. 7 is a flowchart illustrating procedures for calculating a transformation matrix $T_m$.

FIG. 7 is a flowchart illustrating procedures for calculating a transformation matrix $T_{cm}$ using Equations (4) and (5).

In S701, the rotational translation component R is estimated.

The coordinate values of the vertices of the marker in the ideal screen coordinate system 403 give an equation (Equation (6)) of two opposite sides-straight lines.

Substituting $(x_c, y_c)$ in Equation (5) into Equation (6) gives Equation (7).

$$a_1 x + b_1 y + c_1 = 0, \quad a_2 x + b_2 y + c_2 = 0 \quad (6)$$

$$a_1 P_{11} X_c + (a_1 P_{12} + b_1 P_{22}) Y_c + (a_1 P_{13} + b_1 P_{23} + c_1) Z_c = 0$$

$$a_2 P_{11} X_c + (a_2 P_{12} + b_2 P_{22}) Y_c + (a_2 P_{13} + b_2 P_{23} + c_2) Z_c = 0 \quad (7)$$

Equation (7) represents planes in three-dimensional space expressed by the camera coordinate system 402 and means that the sides of a marker in the three-dimensional space exist in the planes. Since two opposites sides of the marker are parallel, their direction vectors coincide and are oriented to the in-plane direction of the two planes represented by Equation (7). That is, the outer product of normal vectors of the two planes represented by Equation (7) coincides with the direction vector of the two parallel sides in the camera coordinate system 402.

By performing this calculation on two pairs of parallel sides, it is possible to determine the direction vectors $U_1$ and $U_2$ of two adjacent sides of the marker. Since the marker is square according to this embodiment, ideally the two vectors are orthogonal to each other. Actually, however, they are not orthogonal because of measurement errors. Thus, two orthogonal unit vectors $V_1$ and $V_2$ are calculated in a plane which contains the two measured vectors and used instead of $U_1$ and $U_2$.

Also, a unit vector $V_3$ perpendicular to the maker plane can be obtained by calculating the outer product of $V_1$ and $V_2$. In that case, $[V_1{}^t, V_3{}^t, V_3{}^t]$ is the rotational translation component R of the transformation from the marker coordinate system 401 to the camera coordinate system 402.

However, it is necessary to establish correspondence between the two direction vectors and the X and Y axes of the marker coordinate system 401 as well as positive and negative directions in advance based on the results of the template matching. Since the Z axis in the marker coordinate system 401 is directed downward from the marker plane, it should be established such that its inner product with a direction vector directed from the origin of the camera coordinate system 402 toward the intersection of the marker diagonals in the ideal screen coordinate system 403 will be positive.

In S702, the parallel translation component T is estimated.

Eight linear equations in terms of $T_1$, $T_2$, and $T_3$ are obtained if Equations (4) and (5) are combined and the coordinate values of the four marker vertices in the marker coordinate system 401 and the ideal screen coordinate system 403 are substituted into the resulting equation. Since matrices P and R are known, $T_1$, $T_2$, and $T_3$ can be calculated from them.

Finally, in S703, the transformation matrix $T_{cm}$ is modified. $T_{cm}$ can be determined after a fashion by the calculations up to S702, but calculation of a rotational matrix R often involves serious errors. Thus, the rotational matrix R is modified once again. The rotational matrix, which is represented by nine parameters $R_{11}$ to $R_{33}$, are represented this time by three rotational angles (a: tilt direction of the $Z_m$ axis; b: tilt angle of the $Z_m$ axis; c: rotational angle of the $X_m$-$Y_m$ plane around the $Z_m$ axis).

This is a modification to the ZYZ Euler angle representation. With the normal Euler angle representation, very small variations in vectors may significantly affect rotational angles, but the modified representation reduces this effect.

Equation (8) expresses a rotational matrix in terms of rotational angles.

The values of a, b, and c are modified to minimize the sum of squares of differences between the values calculated here and values actually determined by image processing. Specifically, the rotational matrix R is newly determined by repeating hill-climbing 10 times. Also, parallel translation component T is updated using the process of S702 again.

A transformation matrix $T_{sc}$ for transformation from the camera coordinate system 402 to the HMD screen coordinate system 406 is calculated in advance using a known calibration method. The calculated matrix is used as a projection matrix for projection from the camera coordinate system 402 to the HMD screen coordinate system 406.

In this way, the viewpoint and orientation calculating unit 104 determines a transformation matrix for projection of a three-dimensional CG model data expressed in the marker coordinate system 401 to the HMD screen coordinate system 406 using the transformation matrix $T_{sc}$ as well as the transformation matrix $T_{cm}$ for transformation from the marker coordinate system 401 to the camera coordinate system 402 and outputs it as viewpoint and orientation information to the image generating unit 105, where the transformation matrix $T_{cm}$ is obtained by sequential observation.

By using this transformation matrix, the image generating unit 105 can generate a CG image projected properly to the HMD screen coordinate system 406 and generate a composite image in which the CG image is aligned properly with an actually-sensed image. Consequently, the observer can view a virtual object expressed in the marker coordinate system as if it were an object existing at the marker position in the real world.

If three-dimensional CG model data which represent the measurable ranges of the sensors 301 are prepared in advance as the three-dimensional CG model data of the virtual object, the sensors 301 to which two-dimensional markers are attached are observed sequentially by the video cameras 101, and three-dimensional CG models are displayed by being aligned with the real space through the above processes; the observer can work by checking the measurable ranges.

Incidentally, the CG images which represent the sensors' measurable ranges may be generated and displayed constantly, but they can hinder experience of a sensation produced by a mixed reality application. To deal with this situation, it is conceivable to allow the observer to turn on and off $$R = \begin{bmatrix} \cos a \cos b \cos(c-a) - \sin a \sin(c-a) & -\cos a \cos b \sin(c-a) - \sin a \cos(c-a) & \cos a \sin b \\ \sin a \cos b \cos(c-a) + \cos a \sin(c-a) & -\sin a \cos b \sin(c-a) + \cos a \cos(c-a) & \sin a \sin b \\ -\sin b \cos(c-a) & \sin b \sin(c-a) & \cos b \end{bmatrix} \quad (8)$$

Equation (9) can be derived from Equation (8), making it possible to determine rotational angles a to c from the rotational matrix R.

$\cos b = R_{33}$ $\cos a = R_{13}/\sin b$ $\sin a = R_{23}/\sin b$ $\sin c = (R_{32}R_{13} - R_{31}R_{23})/(R_{13}{}^2 + R_{23}{}^2)$ $\cos c = -(R_{13}R_{31} - R_{23}R_{32})/(R_{13}{}^2 + R_{23}{}^2)$ (9)

Therefore, by substituting the coordinate values of the four marker vertices into Equations (4) and (5) using $T_{cm}$ determined so far, it is possible to calculate the corresponding coordinate values in the ideal screen coordinate system 403.

the display dynamically using a switch or increase or decrease transparency as required by making the degree of display transparency variable.

Also, according to this embodiment, two-dimensional markers are attached to the desired sensors to visualize the measurable ranges, but there is no need to use actual sensors, for example, when checking sensor layout. If sensors are large or heavy, it is advisable to attach two-dimensional markers to something that can be moved easily such as the tips of rackets or sticks, check sensor layout by visualizing their measurable ranges, and install an actual sensor when the sensor layout is established. This will improve working efficiency.

Although according to this embodiment, one two-dimensional marker is used for each sensor, if positional relationship among sensors is defined in advance, two or more point markers can be used for each sensor. Similarly, two or more two-dimensional markers can be used.

Thus, by visualizing sensors' measurable ranges as a virtual object using a mixed reality technique, this embodiment makes it possible to determine installation locations of sensors quickly in an appropriate manner without relying on hunches.

Also, when running a mixed reality application, the observer can understand the measurable ranges of sensors and move in a proper range.

Second Embodiment

An image compositing apparatus according to a second embodiment involves installing a position and orientation sensor, acquiring position and orientation information in a global coordinate system on the head of the observer based on measurement values from the actually installed position and orientation sensor, superimposing three-dimensional CG model data (prepared in advance) which represent the sensor's measurable range defined in the global coordinate system on an actually sensed image obtained from a camera installed near the line of sight of the observer, thereby visualizing the measurable range of the position and orientation sensor.

This embodiment allows the position and orientation of the user in the global coordinate system to be determined from output values of the sensor. Thus, the three-dimensional CG model data which represent the measurable range of the sensor are managed in the global coordinate system. Again, according to this embodiment, the three-dimensional CG model data used to visualize the measurable range may be based on either sensor specifications or experience. Also, the model data may be displayed by any method.

Figure 10:
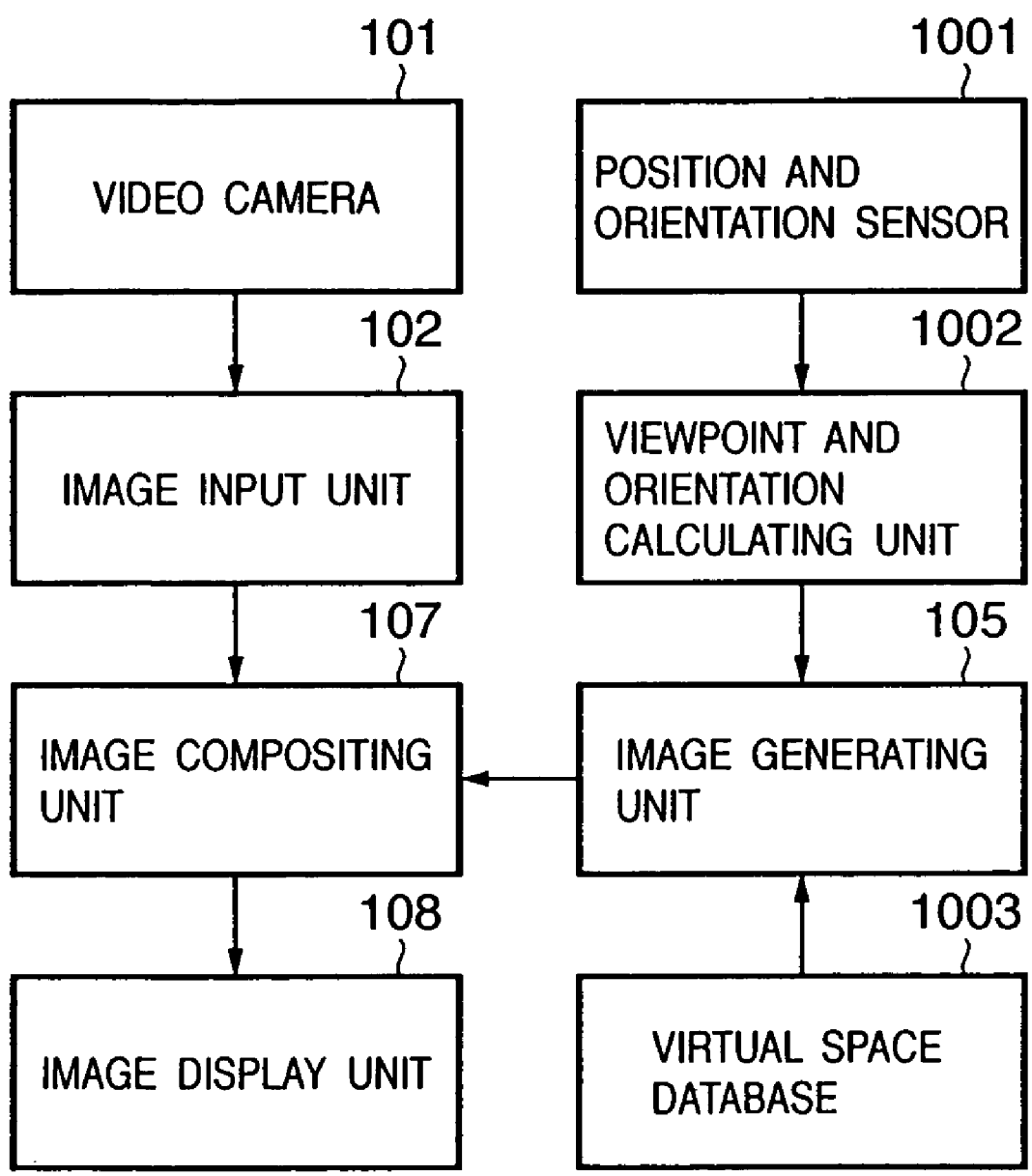
FIG. 10 is a block diagram showing a configuration example of the image compositing apparatus according to the second embodiment of the present invention.

A configuration example of the image compositing apparatus according to the second embodiment is shown in FIG. 10, where the same components as those in FIG. 1 are denoted by the same reference numerals as the corresponding components in FIG. 1, and description thereof will be omitted.

Reference numeral 1001 denotes a position and orientation sensor to detect the viewpoint and orientation of a user, and 1002 denotes a viewpoint and orientation calculating unit which calculates a transformation matrix based on output of the position and orientation sensor 1001 to transform a global coordinate system into the HMD screen coordinate system 406. Using the transformation matrix calculated by the viewpoint and orientation calculating unit 1002, the image generating unit 105 generates a virtual object image based on a three dimensional model defined in the global coordinate system and stored in a virtual space database 1003.

However, as is well known in the area of mixed reality technology, output values of the position and orientation sensor may be corrected using information from the marker.

Figure 8:
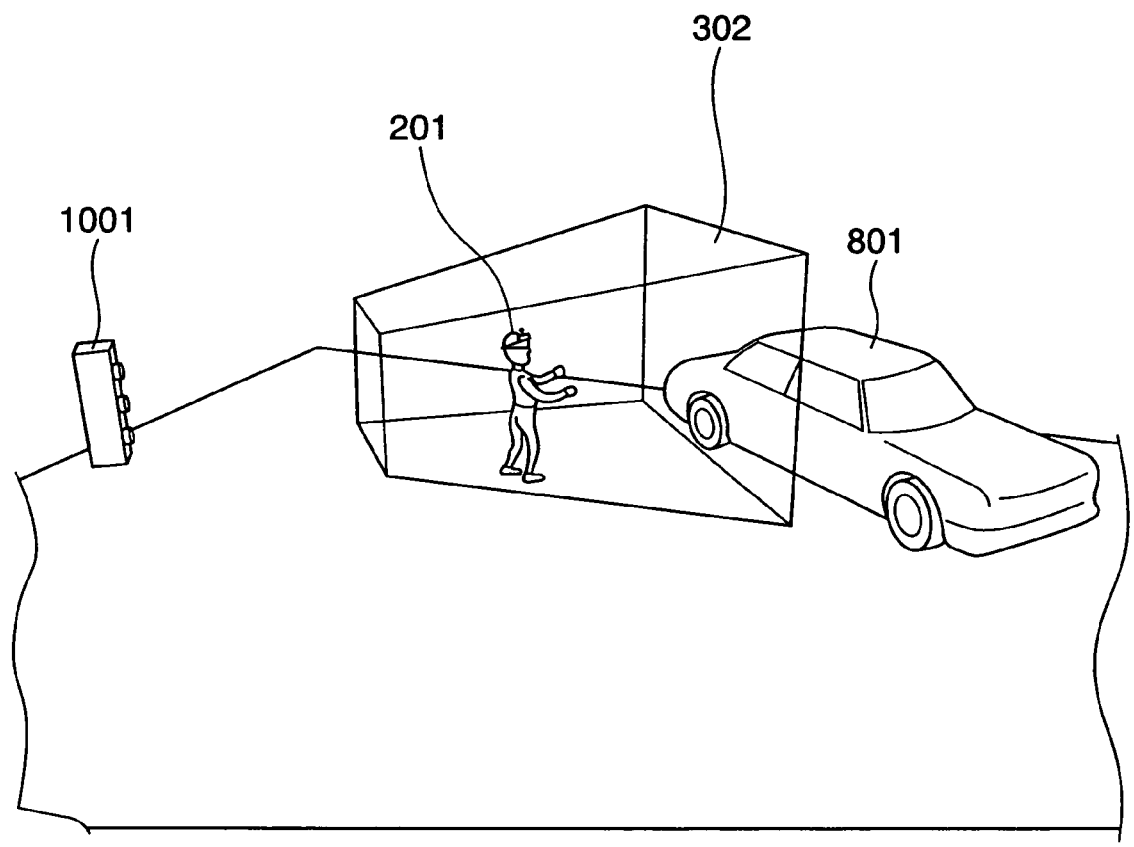
FIG. 8 is a diagram schematically showing a display of a sensor's measurable range implemented by an image compositing apparatus according to a second embodiment.

FIG. 8 is a diagram schematically showing a display of a sensor's measurable range implemented by the image compositing apparatus according to this embodiment.

The position and orientation sensor 1001 detects the position and orientation of the observer 201. Three-dimensional CG model data prepared in advance (and described in the global coordinate system, according to this embodiment) to represent the measurable range 302 of the position and orientation sensor 1001 and three-dimensional CG model data of a CG object 801 to be presented to the observer 201 are read out of the virtual space database 1003. A three-dimensional CG image projected to the HMD screen coordinate system 406 of the HMD 108 is generated using the observer's position and orientation measured by the position and orientation sensor 1001 and a transformation matrix obtained from the viewpoint and orientation calculating unit 1002. The image compositing unit 107 composites the actually-sensed image obtained from the image input unit 102 with a CG image obtained from the image generating unit 105 and displays the resulting image on the HMD 108. This allows the observer to visually recognize the measurable range of the position and orientation sensor 1001.

If the measurable range of the sensor 1001 is simply presented to the observer 201 using a three-dimensional CG image 302, the observer 201 has a sensation of being confined in the CG image which represents the measurable range. Furthermore, in a mixed reality application, the CG image which represents the measurable range is superimposed on the CG object to be visually recognized primarily, causing degradation of drawing quality or obstructing visual recognition of the CG object.

In this embodiment, it is sufficient if the observer 201 understands the limits within which the sensor can measure in real space. Thus, it is not strictly necessary to constantly draw the CG image which represents the measurable range 302. For example, when the observer 201 approaches a boundary line of the measurable range, the three-dimensional object which represents the measurable range may be displayed by adjusting the degree of transparency, thereby notifying the observer 201 that he/she is approaching a limit of the measurable range.

The use of such a display method makes it possible to implement a method which does not display a CG image representing the measurable range when the position and orientation of the observer 201 is being obtained properly (i.e., when the observer 201 is well within the measurable range of the sensor), but indicates boundaries of the measurable range explicitly as the observer 201 approaching a boundary of the measurable range.

Thus, by visualizing sensors' measurable ranges as a virtual object, this embodiment also makes it possible to determine installation locations of sensors quickly in an appropriate manner without relying on hunches.

Also, when running a mixed reality application the observer can understand the measurable ranges of sensors and move in a proper range.

Third Embodiment

In all the above embodiments, the measurable ranges of sensors are presented to the observer. Besides, visualized measurable ranges of sensors may be presented to an operator of the image compositing apparatus. When the operator monitors operations of an observer, if the measurable ranges of sensors are visualized on an operation screen of the operator, the operator can keep track of the positional relationship between the observer and sensors' measurable ranges, and thus can lead the observer to an appropriate position.

When dynamically presenting a CG object such as the one shown in FIG. 8 to the observer, it is possible to put the CG object in a location most visible to the observer.

In this way, when presenting a sensor's measurable range to the operator, as shown in FIG. 8, an observer (registered three-dimensional CG model) and sensor's measurable range can be generated as a CG image by the image generating unit 105 using viewpoint and orientation of a third party and displayed on an operator's display unit (not shown). Alternatively, mixed reality space may be shown schematically from above as in the case of a bird's-eye view.

Incidentally, if the measurable ranges of position and orientation sensors placed in real space can be drawn as a virtual object by computer graphics, aligned with and superimposed on an actually-sensed image, and thereby visualized; the present invention can be applied to image compositing apparatus of any configuration in addition to those according to the above embodiments.

Fourth Embodiment

An image compositing apparatus according to a fourth embodiment uses an objective camera in addition to a position and orientation sensor and visualizes and presents the measurable ranges of both the sensor and objective camera to acquire position and orientation information of an observer more accurately.

A technique has been proposed which corrects position and orientation information of an observer by using an objective camera in addition to a position and orientation sensor. (K. Satoh, S. Uchiyama, and H. Yamamoto: "A Head Tracking Method Using Bird's-Eye View Camera and Gyroscope," Proc. 3rd IEEE/ACM Int'l Symp. on Mixed and Augmented Reality (ISMAR 2004), pp. 202-211, November 2004.)

When acquiring position and orientation information using an objective camera, it is difficult to determine what view range (measurable range) the objective camera covers and to what extent the objective camera can contribute to the acquisition of the position and orientation information, based on an actually-sensed video image of the objective camera. Also, when taking measurements with two or more objective cameras arranged in a scene to increase the accuracy of position and orientation information, there is a need for information as to which objective cameras overlap in measurable ranges, but it is difficult to obtain such information from actually-sensed video images from the objective cameras alone.

That is, placement of an objective camera in a scene has the same problems as with the sensors described earlier. To solve these problems, this embodiment presents the view range (measurable range) of the objective camera to the operator and observer by visualizing it in the same way as the measurable ranges of the sensors described earlier.

Figure 11:
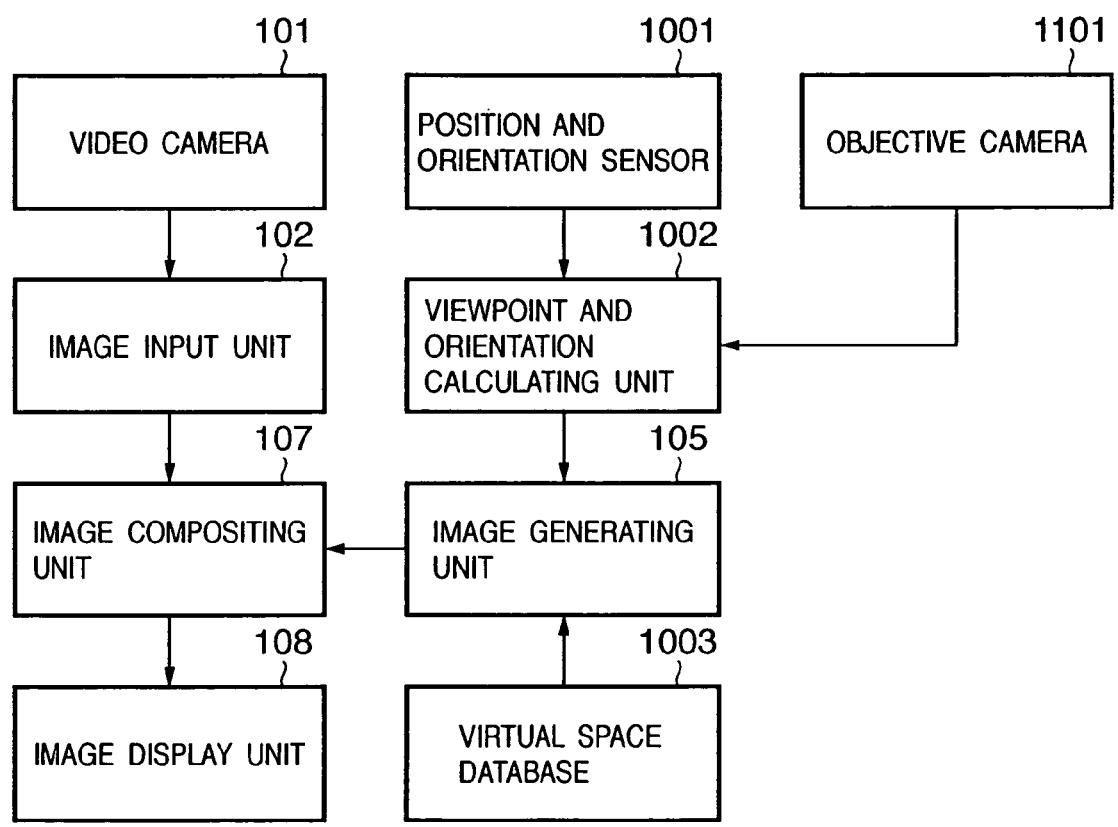
FIG. 11 is a block diagram showing a configuration example of an image compositing apparatus according to a fourth embodiment of the present invention.

A configuration example of the image compositing apparatus according to the fourth embodiment is shown in FIG. 11, where the same components as those in FIG. 1 are denoted by the same reference numerals as the corresponding components in FIG. 1, and description thereof will be omitted.

Reference numeral 1101 denotes an objective camera placed to detect the viewpoint and orientation of the user accurately. The objective camera 1101 photographs the user from a predetermined position and orientation, detects the viewpoint and orientation of the user from the photographic image, and outputs them. The viewpoint and orientation are used to correct the output of the position and orientation sensor 1001. The viewpoint and orientation calculating unit 1002 corrects the output of the position and orientation sensor 1001 with the position and orientation information outputted by the objective camera 1101 and calculates a transformation matrix for transformation of a global coordinate system into the HMD screen coordinate system 406 based on the values resulting from the correction. Using the transformation matrix calculated by the viewpoint and orientation calculating unit 1002, the image generating unit 105 generates a virtual object image based on a three dimensional model defined in the global coordinate system and stored in a virtual space database 1003.

Figure 12:
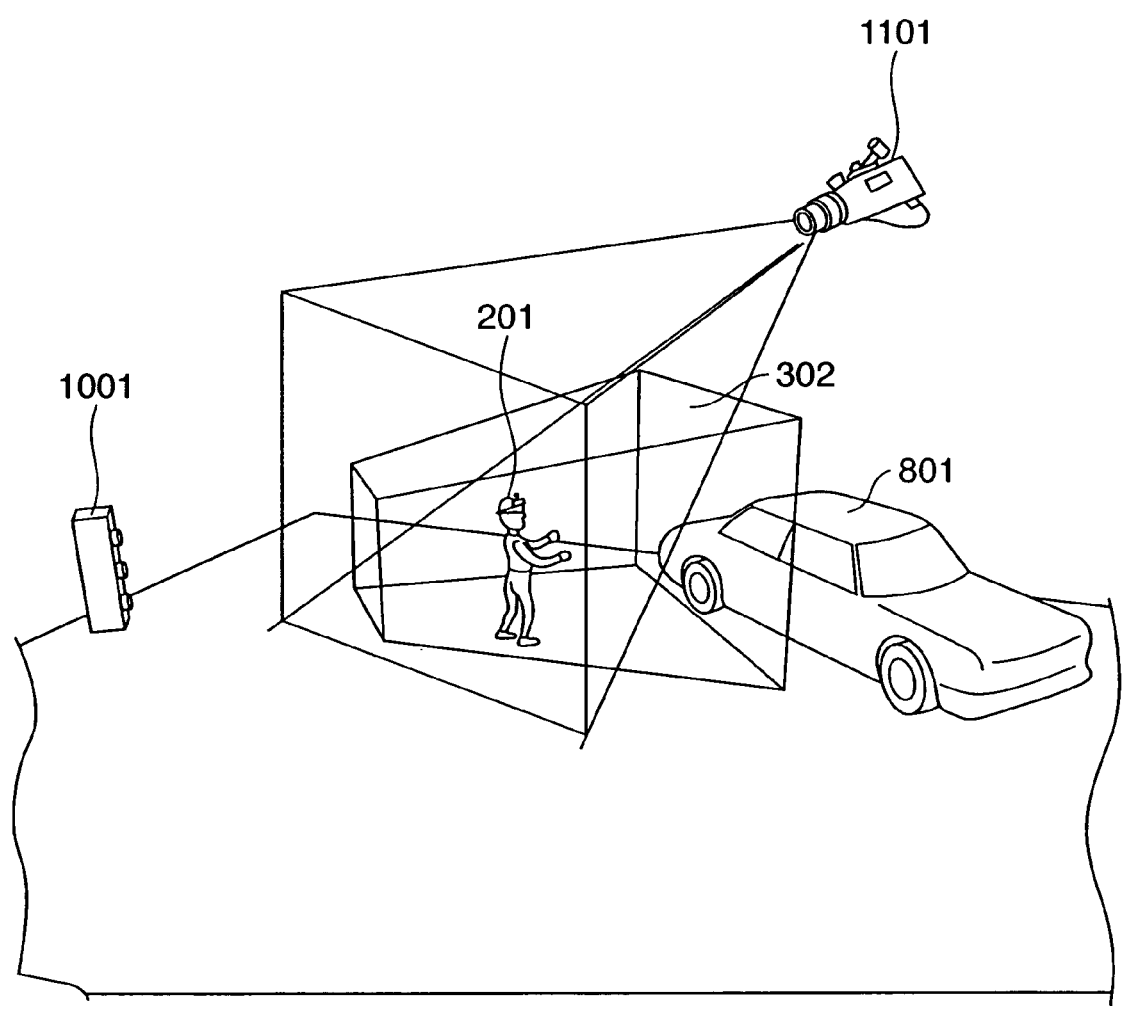
FIG. 12 is a diagram schematically showing visualization of measurable ranges of a position and orientation sensor and objective camera according to the fourth embodiment.

FIG. 12 is a diagram schematically showing a display of a sensor's measurable range implemented by the image compositing apparatus according to the fourth embodiment.

The objective camera 1101 and position and orientation sensor 1001 detect the position and orientation of the observer 201. Three-dimensional CG model data prepared in advance (and described in the global coordinate system, according to this embodiment) to represent the measurable ranges of the objective camera 1101 and position and orientation sensor 1001 as well as three-dimensional CG model data of a CG object 801 to be presented to the observer 201 are read out of the virtual space database 1003. A three-dimensional CG image projected to the HMD screen coordinate system 406 of the HMD 108 is generated using the observer's position and orientation measured by the position and orientation sensor 1001 and corrected with the position and orientation of the viewpoint measured by the objective camera 1101 as well as using a transformation matrix obtained from the viewpoint and orientation calculating unit 1002. The image compositing unit 107 composites the actually-sensed image obtained from the image input unit 102 with a CG image obtained from the image generating unit 105 and displays the resulting image on the HMD 108. This allows the observer to visually recognize the measurable ranges of the objective camera 1101 and position and orientation sensor 1001. Although only a single objective camera is illustrated in FIG. 12, two or more objective cameras may be used depending on the system to be constructed.

The depth of the CG object which represents the view range (measurable range) of the objective camera 1101 is determined based on information obtained in advance as to the distance within which a marker can be observed from the objective camera. Thus, it depends on the size of the marker used for measurement and performance of the camera.

Although according to this embodiment, the measurable range is visualized by calculating the position and orientation of the observer using a combination of a position and orientation sensor and objective camera, it is not strictly necessary to use a combination with a position and orientation sensor. For example, mixed reality space may be constructed using a combination of an orientation sensor such as a gyroscope and an objective camera.

Other Embodiment

In all the above embodiments, the measurable ranges of a sensor and objective camera are presented to the observer or operator of the image compositing apparatus.

Methods for presenting the measurable ranges of sensors and objective cameras to the observer and operator more effectively include a method which involves color-coding acquisition accuracies of position and orientation information in the measurable ranges and presenting them by gradation display, a method which involves displaying view ranges (measurable ranges) as semitransparent CG objects whose colors are mixed as they overlap, indicating the degree of overlap, and a method which involves presenting camera numbers of the objective cameras in the scene as annotations on the objective cameras to the observer and operator.

Also, functions equivalent to those of the image compositing apparatus described above may be implemented by a system consisting of multiple pieces of equipment.

Incidentally, the present invention also includes a configuration in which software programs that implement the functions of the above embodiments are supplied from a recording medium directly or via wire/wireless communications to a system or apparatus containing a computer that can execute the programs and the computer contained in the system or apparatus executes the supplied programs, thereby performing functions equivalent to those of the above embodiments.

Thus, program code supplied to and installed on a computer to implement functional processes of the present invention on the computer also implements the present invention. That is, the computer programs which implement the functional processes of the present invention are also included in the present invention.

In that case, the program code may take any form including object code, programs executed by an interpreter, and script data supplied to an OS as long as it has program functions.

Recording media available for use to supply programs include, for example, magnetic recording media such as flexible disks, hard disks, and magnetic tape; optical/magneto-optical storage media such as MO, CD-ROM, CD-R, CD-RW, DVD-ROM, DVD-R, and DVD-RW media; and nonvolatile semiconductor memories.

Methods for supplying programs via wire or wireless communications include a method that involves storing programs or the like on a server on a computer network and downloading the programs or the like onto a requesting client computer, where the programs or the like may be computer programs themselves which implement the present invention or a data file (program data file) such as a compressed self-installing file which constitutes computer programs capable of implementing the present invention on client computers. In that case, the program data file may be divided into segment files, which may be stored on different servers.

That is, server machines which allow the program data file capable of implementing the functional processes of the present invention on a computer to be downloaded to multiple users are also included in the present invention.

The present invention can also be implemented by storing the programs of the present invention in an encrypted state in a storage medium such as a CD-ROM, providing key information for decryption to a user who satisfies predetermined conditions, for example, through a download from a homepage via the Internet, and allowing the user to decrypt and install the programs on a computer using the key information.

The functions of the above embodiments may be implemented not only by the programs read out and executed by the computer, but also by part or all of the actual processing executed, in accordance with instructions from the programs, by an OS running on the computer.

Furthermore, the functions of the above embodiments may also be implemented by part or all of the actual processing executed by a CPU or the like contained in a function expansion board inserted in the computer or a function expansion unit connected to the computer if the processing is performed in accordance with instructions from the programs that have been read out of the storage medium and written into memory on the function expansion board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-258405 filed on Sep. 6, 2004, which is hereby incorporated by reference herein.

What is claimed is:

1. An image compositing method for presenting a composite image to a user wearing a head mounted display, comprising:
an acquisition step of acquiring, by using a position and orientation sensor, a position and orientation of the head mounted display;
a compositing step of generating a first composite image by compositing an actually-sensed image and a first computer graphics image based on the acquired position and orientation;
a superimposing step of superimposing a second computer graphics image, which represents a measurable range of the position and orientation sensor, on the first composite image only when the user, within the measurable range, approaches a boundary of the measurable range of the position and orientation sensor, wherein said superimposing step generates a second composite image by superimposing the second computer graphics image on the first composite image;
a presenting step of presenting the first or second composite image to the user via the head mounted display;
a setting step of setting three-dimensional computer graphics models which represent at least two measurable ranges; and
a CG image generating step of generating a third computer graphics image which represents an overlap region of at least two measurable ranges, the color of the third computer graphics image being different from the color of the second computer graphics image;
wherein said superimposing step further generates a third composite image by superimposing the third computer graphics image on the actually-sensed image when the user is outside of the measurable ranges; and
wherein said presenting step further presents the third composite image when the user is outside of the measurable range.

2. The image compositing method according to claim 1, wherein the acquisition step acquires the position and orientation of the head mounted display using an image of a marker attached to the position and orientation sensor and prestored position information about the marker, where the image of the marker is contained in the actually-sensed image.

3. A non-transitory computer-readable recording medium for storing a program for making a computer perform the image compositing method according to claim 1.

4. An image compositing apparatus for presenting a composite image to a user wearing a head mounted display, comprising:
an acquisition unit for acquiring, by using a position and orientation sensor, a position and orientation of the head mounted display;
a compositing unit for generating a first composite image by compositing an actually-sensed image and a first computer graphics image based on the acquired position and orientation;
a superimposing unit for superimposing a second computer graphics image, which represents a measurable range of the position and orientation sensor, on the first composite image only when the user, within the measurable range, approaches a boundary of the measurable range of the position and orientation sensor, wherein said superimposing unit generates a second composite image by superimposing the second computer graphics image on the first composite image;
a presenting unit for presenting the first or the second composite image to the user via the head mounted display;
a setting unit of setting three-dimensional computer graphics models which represent at least two measurable ranges; and a CG image generating unit of generating a third computer graphics image which represents an overlap region of at least two measurable ranges, the color of the third computer graphics image being different from the color of the second computer graphics image;

wherein said superimposing unit further generates a third composite image by superimposing the third computer graphics image on the actually-sensed image when the user is outside of the measurable ranges; and wherein said presenting unit further presents the third composite image when the user is outside of the measurable range.

* * * * *